(12) United States Patent
Ohata et al.

(10) Patent No.: US 7,762,475 B2
(45) Date of Patent: Jul. 27, 2010

(54) METHOD OF SPRAY APPLICATION OF MONOLITHIC REFRACTORY, SPRAY MATERIAL FOR USE THEREIN, AND APPLICATION APPARATUS

(75) Inventors: Hiroki Ohata, Kitakyushu (JP); Hiroyoshi Tomono, Kitakyushu (JP); Toyohiko Kawahara, Kitakyushu (JP); Yoshihiro Mizuma, Kitakyushu (JP); Koji Goda, Kitakyushu (JP); Yoshinori Nishiumi, Takasago (JP); Norikazu Shirama, Takasago (JP)

(73) Assignee: Krosakiharima Corporation, Fukuoka (JP)

( * ) Notice: Subject to any disclaimer, the term of this patent is extended or adjusted under 35 U.S.C. 154(b) by 639 days.

(21) Appl. No.: 11/628,806

(22) PCT Filed: Jun. 7, 2005

(86) PCT No.: PCT/JP2005/010431

§ 371 (c)(1),
(2), (4) Date: Jan. 25, 2007

(87) PCT Pub. No.: WO2005/121676

PCT Pub. Date: Dec. 22, 2005

(65) Prior Publication Data

US 2007/0241204 A1 Oct. 18, 2007

(30) Foreign Application Priority Data

Jun. 7, 2004 (JP) .............................. 2004-169140
Dec. 10, 2004 (JP) .............................. 2004-359146
Dec. 28, 2004 (JP) .............................. 2004-381332

(51) Int. Cl.
*A62C 5/02* (2006.01)

(52) U.S. Cl. ............................ 239/8; 239/407; 239/413; 239/427.3; 239/428

(58) Field of Classification Search ............... 239/8–10, 239/398, 407, 413, 416.1, 427, 427.3, 427.5, 239/428

See application file for complete search history.

(56) References Cited

U.S. PATENT DOCUMENTS 2,543,517 A * 2/1951 Anderson .................... 239/602

(Continued)

FOREIGN PATENT DOCUMENTS

JP 63-031562 2/1988

(Continued)

*Primary Examiner*—Len Tran
*Assistant Examiner*—Jason J Boeckmann
(74) *Attorney, Agent, or Firm*—Jordan and Hamburg LLP

(57) ABSTRACT

Disclosed is a method and apparatus for spray application of a monolithic refractory material, designed to add water to a powder material and knead the powder material during feeding. In the method and apparatus, a primary water injector 7 is arranged in a feed hose 5 extending from a spray-material supply device 1 to a distal spray nozzle 4, and a secondary water injector 8 is arranged in the feed hose at a position just before the distal spray nozzle 4. The primary water injector 7 is arranged on an upstream side of the secondary water injector 8 with a given distance therebetween. 10 to 50 mass %, preferably 15 to 40 mass %, of application water on the basis of the total application water required for the spray application is added from the primary water injector together with compression air in the form of water particles having an average particle size of 100 μm or less, to evenly wet a spray material during feeding to the extent capable of preventing the spray material from being slurried. Then, the remaining application water is injected from the secondary water injector together with compression air. The spray application method and apparatus of the present invention can achieve a high kneading effect by a low amount of application water while improving operational efficiency.

10 Claims, 3 Drawing Sheets

U.S. PATENT DOCUMENTS

| | | | | |
|---|---|---|---|---|
| 3,476,318 | A | * | 11/1969 | Eckert ........................ 239/10 |
| 3,622,077 | A | * | 11/1971 | Wiegand ..................... 239/424 |
| 4,421,797 | A | * | 12/1983 | Koehne ....................... 427/403 |
| 4,638,945 | A | * | 1/1987 | Toda et al. .................. 239/143 |
| 5,283,215 | A | * | 2/1994 | Hosokawa et al. .......... 501/120 |
| 5,319,894 | A | * | 6/1994 | Shank, Jr. ................... 451/102 |
| 5,429,741 | A | * | 7/1995 | Webb et al. .............. 210/242.4 |
| 5,932,506 | A | * | 8/1999 | Bogan ......................... 501/89 |
| 5,976,632 | A | * | 11/1999 | Gerber et al. ............... 427/426 |
| 6,592,048 | B2 | * | 7/2003 | Motoki et al. .................. 239/8 |

FOREIGN PATENT DOCUMENTS

| | | |
|---|---|---|
| JP | 10-316478 | 12/1998 |
| JP | 2002-220288 | 8/2002 |

* cited by examiner

Fig. 5

METHOD OF SPRAY APPLICATION OF MONOLITHIC REFRACTORY, SPRAY MATERIAL FOR USE THEREIN, AND APPLICATION APPARATUS

TECHNICAL FIELD

The present invention relates to a method for spray application of a monolithic refractory material, during building or repairing of various types of metal containers and kilns, such as a blast furnace, a trough, a torpedo car, a converter, a ladle, a secondary refining furnace, a tundish, a cement rotary kiln, a waste melting furnace, an incinerator or a nonferrous metal container. The present invention also relates to a spray material for use in this method, and an application apparatus.

BACKGROUND ART

A method for spray application of a monolithic refractory material can be roughly classified into a wet application method and a dry application method.

In the wet application method, a monolithic refractory material slurried by adding application water to a raw material and kneading (or mixing) them is pressure-fed (i.e., fed under pressure), and sprayed together with an accelerator (i.e., set accelerating agent) or the like added thereto in a distal nozzle section. In the dry application method, a monolithic refractory material is air-carried (i.e., fed in an air-carried manner) in a dry state, and sprayed together with application water injected thereinto in a distal nozzle section.

As compared with the dry application method, the wet application method has advantages, for example, of being able to form a dense refractory spray-applied product excellent in adhesion and to reduce an amount of dust generation during the application. At the same time, the wet application method has disadvantages of the need for being equipped with a kneading device and a slurry pressure-feeding device which are structurally complicated and costly, and a time-consuming post-spraying operation of cleaning the slurried monolithic refractory material attached on the kneading device and an inner surface of a feed hose.

In this respect, the dry application method having a simple scheme of injecting application water into an air-carried dry monolithic refractory material in a distal nozzle section can have a simplified spray application apparatus and higher operation efficiency. However, the monolithic refractory material, i.e., a spray material, is sprayed without allowing the water to be sufficiently mixed therewith. Thus, a large amount of dust (coarse particulate) is generated during the spraying, and a refractory structure of a spray-applied product is apt to become nonuniform, to cause deterioration in deposit efficiency, bonding strength and corrosion resistance. Moreover, the dry application method has a disadvantage of difficulty in obtaining a dense spray-applied product due to lower kneading (or mixing) effect and the use of a larger amount of water as compared with the wet application method.

As an improvement in the conventional dry application method, there has been previously studied a dry application technique of injecting water into a spray-material feed passage of a hose for feeding a spray material to aim for a kneading effect based on an internal collision of the spray material or a collision between the spray material and an inner surface of the hose. This technique has an advantage of suppressing the dust generation which is one disadvantage in the conventional dry application method, and improving the quality of a spray-applied product.

For example, the following Patent Publication 1 discloses a spray application method which comprises adding water at two positions of a line of spray-material-feeding compressed air and a spray nozzle. The Patent Publication 1 includes a description about injecting water into the spray-material-feeding compressed air as a preliminary kneading. Specifically, it is described that the water added into the air in an evenly dispersed manner makes it possible to solve a problem about insufficient kneading so as to allow the use of a shorter nozzle and prevent an attachment of a spray material on an inner surface of a hose due to locally uneven dispersion of water. While this method would be really effective in reducing an amount of dust generation and suppressing an attachment of the spray material on the inner surface of the hose as compared with the case of adding water only at the spray nozzle, an adequate kneading effect cannot be obtained because the spray material is hardly evenly wetted with water if it is simply sprayed. Therefore, this technique could not provide a denser spray-applied product with lower water content as compared with the conventional dry application method.

The following Patent Publication 2 discloses a two-stage water injection-type spray application method which comprises adding application water in an amount capable of obtaining a castable working-consistency, into a air-carried monolithic refractory material together with compressed air through a watering device just before a spray nozzle, and additionally adding an coagulant or a shape-retentivity imparting agent into the monolithic refractory material at the spray nozzle. According to the description of the Patent Publication 2, in this method, a strong stirring effect derived from adding the application water using high-pressure compressed air allows the water to be evenly mixed with the monolithic refractory material within a short time of period. This makes it possible to solve a problem in conventional dry and semi-wet spray application methods, such as deterioration in working environment due to a rebound loss and deterioration in quality of a spray-applied product due to an increase in water content, and other problems, such as structural complexity of a spray application apparatus, a time-consuming cleaning operation and a large disposal amount of residual spray material. However, in this spray application method, the watering device is designed to add the water in a large amount allowing the spray material to be slurried at once and add the water just before the spray nozzle. This makes it difficult to evenly disperse the water in the spray material and obtain a sufficient kneading effect. Therefore, this spray application method has a problem of difficulty in obtaining a dense spray-applied product. While it is contemplated to arrange the watering device at a position distant from the spray nozzle so as to improve the kneading effect, a feed hose will be likely to cause clogging and a time for the cleaning operation will be increased.

The following Patent Publication 3 discloses a spray application method which comprises feeding a spray material including a refractory aggregate, a refractory powder, a binder, a dispersant and an accelerator, on an airstream into a feed pipe, injecting the entire amount of application water into the spray material at an intermediate position of the feed pipe, further airs-feeding (air-carrying) the spray material, and spraying the spray material through a spray nozzle. According to the description of the Patent Publication 3, even after the entire amount of application water is injected at the intermediate position of the feed pipe to wet the spray material, the monolithic refractory composition is not changed to have a viscosity causing attachment on the feed pipe, and the water to be added can be limited to an amount approximately equal to that in a conventional wet application method to obtain a high-quality spray-applied product.

However, in an actual test based on this method, it was found that, when the entire amount of application water is simply injected at an intermediate position of a feed pipe, a kneaded state becomes insufficient due to a poor affinity of water for the refractory powder, particularly, ultrafine powder materials therein, to cause an increase in rebound loss and an amount of dust generation and deterioration in workability (i.e., decrease in working-consistency), which leads to an disadvantage of hardly obtaining a spray-applied product with stable quality.

Thus, an amount of application water is inevitably increased to ensure an adequate workability. This causes a problem about a local variation in water content of a spray-applied product. Specifically, a region with an excessively large water content of a spray-applied product has a high porosity, and conversely a region with an excessively small water content of a spray-applied product has an insufficient binding. As the result, a desired durability cannot be obtained in both the regions. Moreover, if the application water is added at a position distant from a nozzle hole, the spray material starts aggregating due to melt of the accelerator, to causes problems about the need for increasing an amount of application water, and an increase in time for the bothersome operation of cleaning the feed pipe.

The Patent Publication 3 also includes a description about adding water as a pre-moisture. This water is added to aim for a dust-generation protection effect, and therefore a preliminary kneading effect cannot be adequately obtained by adding such an amount of water.

[Patent Publication 1] Japanese Patent Laid-Open Publication No. 63-31562
[Patent Publication 2] Japanese Patent Laid-Open Publication No. 10-316478
[Patent Publication 3] Japanese Patent Laid-Open Publication No. 2002-220288

DISCLOSURE OF THE INVENTION

In view of the above problems in the conventional dry spray application method which comprises adding water at a spray-material feed pipe, it is an object of the present invention to a spray application method, a spray material for use in the method, and a spray application apparatus, capable of avoiding attachment of a spray material on an inner surface of the spray-material feed pipe while increasing a kneading effect between water and the spray material, so as to obtain a low water-content, dense spray-applied product and facilitate enhanced operation efficiency.

In order to achieve the above objects, according to a first aspect of the present invention, there is provided a method for spray application of a monolithic refractory material, which includes providing a primary water injector arranged in a spray-material feed pipe extending from a spray-material supply device to a distal spray nozzle, and a secondary water injector arranged in the spray-material feed pipe at a position adjacent to the distal spray nozzle, and injecting application water from each of the primary and secondary water injectors into a spray material which is being fed through the spray-material feed pipe. The method is characterized by comprising arranging the primary water injector on an upstream side of the secondary water injector with a given distance therebetween, adding 10 to 50 mass % of application water on the basis of the total mass % of application water required for the spray application from the primary water injector, and adding the remaining mass % of application water from the secondary water injector. In this method, the application water added from the primary water injector is injected together with compressed air in the form of water particles having an average particle size of 100 μm or less.

In the above method of the present invention, water particles having an average particle size of 100 μm or less are injected into the spray material being fed through the spray-material feed pipe. Thus, a specific surface area of water to be added is increased to allow the spray material to be remarkably evenly wetted as compared with the conventional water addition technique so as to obtain enhanced kneading effect within a short period of time even for a spray-material powder which is moving inside the spray-material feed pipe at a high speed. In particular, this method is significantly effective in evenly wetting fine raw-material particles. This makes it possible to obtain a low water-content, dense spray-applied product. The above method of the present invention has been made based on this knowledge.

The water particles are formed to have an average particle size of 100 μm or less, more preferably 70 μm or less, most preferably in the range of 5 to 50 μm. This average particle size may be measured using a laser Doppler technique. If the average particle size of the water particles is greater than 100 μm, the specific surface area of the water is reduced to cause difficulty in evenly wetting the spray material and variation in water content depending on positions of the kneaded material. Consequently, an amount of application water is inevitably increased to allow the spray material to have a desired workability, i.e., a desired working-consistency.

In the present invention, the water particles having an average particle size of 100 μm or less are injected together with compressed air. Thus, the compressed air can be set at a given pressure and/or flow velocity to obtain water particles having a small particle diameter while controlling the particle diameter at a desirable value. Further, when the water injection is stopped after completion of a spraying operation, only the compressed air may be successively supplied to prevent clogging of the spray nozzle.

The water particles having an average particle size of 100 μm or less can be obtained by optimize a nozzle-hole diameter, a pressure and a flow volume of a conventional spray nozzle for injecting an air-water mixture under pressure, in an economically practical range. Specifically, it is known that a particle size of water particles to be injected becomes smaller as a pressure of the air is increased; the nozzle-hole diameter is reduced; or a flow ratio of the water to the air is reduced. Thus, these conditions can be optimized based on an amount of required water to obtain the water particles having an average particle size of 100 μm or less. For example, a water injector includes an inner hole serving as a part of a spray-material feed passage, a single slit-shaped nozzle hole having an elongated opening which extends in a circumferential direction of the inner hole and has a width of 0.1 to 1 mm, a pressure equalization chamber communicating with an upstream side of the nozzle hole, and a mixing chamber communicating with an upstream side of the pressure equalization chamber and having respective inlet ports of pressurized water and compressed air.

The primary water injector is arranged on an upstream side of the secondary water injector with a given distance therebetween. This makes it possible to evenly wet the spray material while obtaining an additional kneading effect from a collision between the spray material and the water particles, an internal collision of the water-containing spray material and a collision between the spray material and an inner surface of the spray-material feed pipe, during feeding of the spray material.

In the present invention, the primary water injector may be provided in a number of two or more. For example, the two primary water injectors may be provided to inject primary application water at two positions individually, without any specific problem.

With a view to evenly dispersing the water particles in the spray material during feeding to evenly wet the spray material, the water particles are injected from the primary water injector in an amount of 10 to 50 mass %, preferably 20 to 40 mass %, on the basis of the total mass % of application water required for the spray application. A dispersant and a binder may be pre-added into the water particles to be injected from the primary water injector. When the dispersant is pre-dissolved in the water particles, the water can be more quickly dispersed in the spray material as compared with a case where the dispersant in a powder form is directly mixed with the spray material. Thus, an amount of application water can be reduced to obtain a lower water-content spray-applied product.

The primary water injector is intended to allow the spray material to have a kneaded state in which fine particles, water and air are connected with each other, i.e., a funicular zone. As disclosed in Kenji Hashimoto, "Kneading Technologies", Oct. 5, 1978, Industrial Technology Center, the funicular zone is one state in a fine classification of a kneaded state of fine particles, water and air, specifically a state in which, while the fine particle is fully coated with liquid, it is in a flaky state in appearance due to existence of gas connected therewith. More specifically, it is a state just before a slurried state in which, while a kneaded material aggregates when it is grasped by hand, it will loosen in a minute. Generally, when water is added to a monolithic refractory material containing a dispersant, little by little, while kneading them, the monolithic refractory material initially has almost no change despite the addition of water, and then suddenly softens when an amount of added water is increased up to a given value. The amount of water to be injected from the primary water injector is intended to be set at a value corresponding to a state just before the sudden softening. In a flow test, a kneaded material in this state has almost no spread, specifically has a flow test ranging from 100 to 110 mm. While an amount of primary application water to be added is varied depending on a type, particle-size and/or amount of refractory raw material, accelerator, dispersant or binder to be used, the above range of the flow test may be used as one of indexes for determining the amount of primary application water. That is, the flow value deviates from the above range when the amount of primary application water is excessively small or large, and an intermediate value of the range corresponds to a desirable amount of primary application water. The flow test was carried out according to JIS-R2521.

From a microscopic viewpoint, 75 μm or less of raw material particles in a powder state are originally formed as secondary particles each of which is an aggregate of some of the raw material particles. In the present invention, it is believed that the raw material particles will be wetted with the water particles while maintaining the form of the secondary particles. The secondary particles are likely to include a large raw material particle having a particle size of greater than 75 μm as a core particle. In the present invention, it is also believed that, the use of significantly small water particles having an average particle size of 100 μm or less allows an amount of water per secondary particle to be reduced to a value less than that for slurrying the secondary particles or a value capable of maintaining a high viscosity in the secondary particles even if they are slurried. Therefore, even if the secondary particles aggregate with each other, they must be hardly formed as slurry. Then, during feeding of the spray material, various collisions, such as a collision between the secondary particles, a collision between the secondary particles and the particles having a particle size of 75 μm or more, and a collision between the secondary particles and the inner surface of the spray-material feed pipe, must further produce an additional kneading effect.

This makes it possible to form a low water-content, highly-kneaded material based on the enhanced kneading effect, and minimize an amount of application water to be injected from the secondary water injector. Thus, a kneaded material having a desired working-consistency can be obtained by a significantly small amount of added water as compared with the conventional dry spray application method. In addition, the spray material is not slurried in the spray-material feed pipe to eliminate the risk of clogging in the spray-material feed pipe. This makes it possible to increase a length of the spray-material feed pipe, for example, to feed the spray material over a long distance of 30 m or more. Further, the spray material is not attached and accumulated on the inner surface of the spray-material feed pipe to eliminate the need for taking a time to clean the spray-material feed pipe.

Comported to the present invention, if the water particles have an average particle size of greater than 100 μm, wetted secondary particles thereof are highly likely to be slurried due to an excessive amount of water per secondary particle. Specifically, as mentioned above, a slurry is formed (i.e., deflocculation occurs) by a slight difference in rate of water content. Thus, when a secondary particle having an excess amount of water collides with a secondary particle having an adequate amount of water during feeding, a slurry will coalescingly grow. That is, a slurry will be locally formed in the spray material during feeding. Consequently, the spray material would be formed as an inhomogeneous mixture due to poor kneading effect, and the slurry would be attached on the inner surface of the spray-material feed pipe.

If an amount of application water to be added by the primary water injector is less than 10 mass % of the total mass % of application water required for the spray application, the amount of application water insufficient to the spray material will cause difficulty in evenly wetting the spray material during feeding. Thus, an amount of application water to be added by the secondary water injector is inevitably increased by the insufficient amount, and the spray material is spray-supplied in an insufficient kneaded state to cause deterioration in quality of a spray-applied product. If the amount of application water to be added by the primary water injector exceeds 50 mass %, a large amount of water will exist in the spray material to be subjected to the kneading effect during feeding, to cause occurrence of the phenomenon that the kneaded material is attached on the inner surface of the spray-material feed pipe.

In the present invention, the remaining mass % of application water is added to the evenly-wetted and kneaded spray material, from the secondary water injector disposed adjacent to the distal spray nozzle, preferable in the form of water particles having an average particle size of 100 μm or less. The water particles having an average particle size of 100 μm or less make it possible to further evenly wet the spray material during feeding so as to obtain further enhanced kneading effect, as described above. Thus, an enhanced kneading effect can be obtained by a significantly small amount of water as compared with the conventional dry spray application method, and therefore a dense spray-applied product with low rebound less and high deposit efficiency can be obtained.

The secondary water injector is disposed adjacent to the distal spray nozzle. The secondary water injector disposed adjacent to the distal spray nozzle makes it possible to reduce the need for cleaning the spray-material feed pipe and provide an kneading effect in the distal spray nozzle. The term "adjacent to the distal spray nozzle" does not mean that the secondary water injector and the distal spray nozzle are formed separately, but the secondary water injector may be attached directly to or integrated with the distal spray nozzle.

An accelerator may be added to water and the obtained mixture may be injected from the secondary water injector. The accelerator added to the water can be quickly dispersed in the wetted spray material to provide higher reactivity and enhanced deposit efficiency.

In view of providing enhanced effect of evenly wetting the spray material in the spray-material feed pipe, the water particles from the primary and/or secondary water injectors are preferably injected at an inclination angle of 30 to 70 degrees relative to an air-carrying direction of the spray material within the spray-material feed pipe and in an umbrella pattern. This umbrella-shaped water-particle distribution may be formed when the water particles are injected together with compressed air from the primary or secondary water injector under the condition that no spray material is fed through the spray-material feed pipe. When the spray material is actually being fed, the inclination angle of the umbrella-shaped water-particle distribution is expanded such that a downstream side of the umbrella shape is stretched.

The water particles to be injected are formed in an umbrella shape, i.e., a planer shape. Thus, when the spray material passes through the plane, the raw material particles of the spray material collide with the water particles to allow the spray material to be more evenly wetted. Further, a part of the water particles having no collision with the raw material particles just after the injection are carried on an airstream feeding the spray material, to form a parallel water-particle flow floatingly moving inside the spray-material feed pipe in a direction parallel to the air-carrying direction of the spray material.

The parallel water-particle flow allows the water particles to come into contact with the raw material particles during feeding and wet the raw material particles so as to provide further enhanced wetting effect. The formation of the umbrella-shaped water-particle distribution is affected by an injection angle of the water particles. Thus, it is desirable to set the injection angle in the above inclination angle range. If the inclination angle is less than 30 degrees, a sufficient wetting effect cannot be obtained to cause insufficiency in kneading and difficulty in obtaining a dense spray-applied product. If the inclination angle exceeds 70 degrees, the water particles will collide with the inner surface of the spray-material feed pipe at a higher rate to cause deterioration in wetting effect.

In the present invention, the water-particle-injecting air is preferably injected at a flow velocity v (n/sec) of 1 V to 3 V on the basis of a flow velocity V (m/sec) of spray-material-carrying air and at a flow volume w of 0.01 W to 0.15 W on the basis of a flow volume W (Nm$^3$/min) of the spray-material-carrying air.

If the flow velocity v of the water-particle-injecting air is less than 1 V, the spray material is hardly evenly wetted to cause insufficiency in kneading and difficulty in obtaining a dense spray-applied product. If the flow velocity v exceeds 3 V, the water particles collide with the opposed inner surface of the spray-material feed pipe to form a water flow along the inner surface. Thus, the water is apt to concentrate on a bottom region of the spray-material feed pipe to cause difficulty in evenly disperse the water particles in the spray-material-carrying air.

If the flow volume w (Nm$^3$/min) of the water-particle-injecting air is less than 0.01 W, a ratio of the water particles to the air becomes excessively large to increase the average particle size and cause difficulty in evenly wetting the spray material. If the flow volume w exceeds 0.15 W, the amount of air is excessively increased, and thereby a rebound loss is increased.

The flow volume w of the water-particle-injecting air means a flow volume of air to be supplied into a pre-mixer, and a flow velocity v of the water-particle-injecting air means a value to be calculated based on the flow volume w and a cross-sectional area of a nozzle hole for injecting the water particles. The flow volume W of the spray-material-carrying air means a flow volume of carrier air supplied for feeding the spray material, and the flow velocity V means a value to be calculated based on a cross-sectional area of a portion of the spray-material feed pipe just before the primary or secondary water injector.

In each of the primary and secondary water injectors, the nozzle hole for injecting the water particles may have an inner surface formed with a spiral concavo-convex portion. In this case, the injected water particles are spirally swirled in the spray-material feed pipe to increase the frequency of contact with the spray material so as to more evenly wet the spray material.

Further, in each of the primary and secondary water injectors, the nozzle hole for injecting the water particles may formed as a plurality of small through-holes each extending toward an axis of the spray-material feed pipe at a given inclination angle relative to the air-carrying direction of the spray material. Preferably, the nozzle hole is formed as an elongated slit extending in a circumferential direction of an inner hole of the primary or secondary water injector. This reason is that the slit-shaped nozzle hole allows the water particles to be injected therefrom into the spray-material feed pipe in a planar pattern so as to facilitate the formation of the umbrella-shaped water-particle distribution and increase the frequency of contact between the water particles and the raw material particles of the spray material. In addition, the slit-shaped nozzle hole is less likely to cause clogging due to the spray material. The slit-shaped nozzle hole may be formed as a plurality of slits or a single continuous slit, along the circumferential direction of the inner hole. In view of generating the water particles having an average particle size of 100 µm or less, an opening of the slit-shaped nozzle hole preferably has a width of 0.1 to 1 mm. If the width is less than 0.1 mm, the slit-shaped nozzle hole is more likely to cause clogging due to the spray material. If the width exceeds 1 mm, the slit-shaped nozzle will have difficulty in generating the water particles having an average particle size of 100 µm or less.

In a spray application apparatus of the present invention, a mixing device may be disposed in the spray-material feed pipe adjacent to the secondary water injector to provide enhanced kneading effect. Specifically, when the spray material wetted by the water injected from the primary water injector, and particularly the spray-material feed pipe is long, coarse raw material particles and fine raw material particles are likely to be separated from each other to cause segregation. The mixing device is provided as a means to return the segregation to the original state. This mixing device makes it possible to obtain a dense spray-applied product without variations. The mixing device may be a conventional standard mixing device, such as a static mixing device. Preferably, the mixing device is composed of a mixing pipe formed to have an inner diameter which is partially narrowed. This mixing pipe desirably has a simple structure having only a narrowed inner diameter, and no risk of clogging due to the spray material. Preferably, the narrows inner diameter d of the mixing pipe is set in the range of 0.5 D to less than 0.9 D on the basis of an inner diameter D of the spray-material feed pipe.

Any conventional wet and dry spray materials may be used as the spray material in the present invention without problems. In use of the conventional wet spray materials, the spray application can be performed with excellent operational efficiency because of no need to have a mixer for kneading the spray material, and no need to take a time for cleaning the spray-material feed pipe after the spraying operation. In addition, a dense spray-applied product can be obtained by an amount of added water approximately equal to that in the conventional wet application method. In use of the conventional dry spray materials, a dense spray-applied product can be obtained by a smaller amount of added water. For example, in iron and steel industries, a magnesia-based spray material for ladles or converters, a magnesia-calcia-based spray material and a magnesia-carbon-based spray material for converters, an alumina-silicon carbide-based spray material for launders, and an alumina-magnesia-based spray material for ladles, may be used. In this case, the application water for water particles may contain an accelerator and/or dispersant dissolved therein in advance.

Among the above spray materials, an alumina-silicon carbide-based monolithic refractory material having a particle size of 75 μm or less and including 5 to 30 mass % of silicon carbide allows the spray application to be adequately performed by a low amount of application water. The silicon carbide constituting the alumina-silicon carbide-based monolithic refractory material is a raw material which is porous and is hardly wetted by water. This is the reason for poor affinity between the alumina-silicon carbide-based monolithic refractory material and the application water. In the present invention, the application water is added through the primary and secondary water injectors each capable of generating water particles having an average particle size of 100 μm or less, to insert the water particles into a porous structure of the silicon carbide. Further, the ratio of silicon carbide fine particles having a particle size of 75 μm or less to the refractory raw material composition is set in the range of 5 to 30 mass %, to allow the water particles to be confined in the matrix of the monolithic refractory material by the silicon carbide fine particles. That is, in the present invention, the low affinity of the application water for the silicon carbide is relaxed based on the insertion of the water particles into the porous structure of the silicon carbide and the confinement of the water particles in the matrix by the silicon carbide fine particles. This makes it possible to promote mixing of the monolithic refractory material added with the water particles at the position of the primary water injector, until the monolithic refractory material reaches the spray nozzle, so as to obtain a spray-applied product with an uniform and dense structure.

In the spray material consisting of an alumina-magnesia-based monolithic refractory material comprising a primary component of 1 to 30 mass % of magnesia fine powder, with the remainder being alumina, enhanced durability can be advantageously obtained. Generally, the magnesia occupying a part of a refractory raw material composition in the alumina-magnesia-based monolithic refractory material is hydrated by a reaction with the application water to cause brittleness in refractory structure and deterioration in strength of a spray-applied product. As mentioned above, in the present invention, the monolithic refractory material is not in contact with the application water for a long period of time, and the amount of application water can be reduced. This makes it possible to suppress the hydration of the magnesia in the alumina-magnesia-based monolithic refractory material so as to provide enhanced strength to a spray-applied product. In addition, the reduction in the amount of application water allows a monolithic refractory structure in a spray-applied product to be densified. This structural densification makes it possible to increase a contact area between alumina particles and magnesia particles in the alumina-magnesia-based monolithic refractory material so as to facilitate formation of a spinel based on a reaction between the alumina and the magnesia under high temperatures during use of the spray-applied product. The formation of the spinal has an advantage of providing enhanced resistance to slags based on spinel's own property and enhanced strength based on a spinel-bonded structure.

If the ratio of magnesia fine particles to the refractory raw material composition is less than 1 mass %, an effect of corrosion resistance in the magnesia cannot be obtained, and an amount of spinel formed through the reaction with the alumina is reduced to cause insufficiency in resistance to slags. If the ratio exceeds 30 mass %, a ratio of magnesia fine particles insufficient in the reaction for forming a spinel under high temperatures during use of the monolithic refractory spray-applied product is increased, and thereby a slag infiltration layer becomes thicker to cause deterioration in durability due to structural spalling defects. In order to provide enhanced reactivity with the alumina, a particle size of the magnesia fine particles is specifically set, for example, at 1 mm or less, preferably, 150 μm or less, as measured by a sieve according to the JIS Standard. Further, the magnesia fine particles may be fine particles having a particle size of 75 μm or less.

A spray material may be classified into a cold spray material and hot spray material by a spray-application temperature. The cold spray material is used for lining of a new kiln or large-scale repairing. A spray-application is performed when for a kiln or the like is in the range of normal temperature to 600° C., and a hydration reaction is promoted in a curing period after completion of the spray-application to create a bonded structure. The hot spray material is used for minor repairing during operation. Thus, this repairing operation has to be performed without cooling a kiln or the like, i.e., when the kiln or the like is at a temperature of 600° C. or more. A bonded structure is quickly formed based on vaporization of water and polymerization or condensation of a binder.

As a cold spray material to be applied at a temperature of 600° C. or less, a mixed composition comprises a mixture prepared by adding a binder which is either one selected from the group consisting of alumina cement, magnesia cement, phosphate and silicate, an accelerator, a dispersant and a fiber to a refractory raw material powder may be used. In this mixed composition, the refractory raw material powder includes 25 to 60 mass % of particles having a particle size of less than 75 μm, and a mass ratio of a first group of the particles having a particle size of less than 10 μm to a second group of the particles having a particle size of 10 μm to less than 75 μm is in the range of 0.25 to 0.7. This mixed composition can be adequate kneaded by a low amount of application water to obtain a dense spray-applied product.

In the spray application method of the present invention, it is believed that the spray material after passing through the primary water injector has secondary particles in a powder form which are dispersed and evenly wetted individually, as mentioned above. While the accelerator, the dispersant and the binder are contained in the secondary particles, these components are added in a small amount and evenly mixed with other refractory raw martial powder during preparation, and therefore the frequency of contact between these components is extremely low. In view of this, it is believed that most of the accelerator, the dispersant and the binder exist in the second particles without losing their original functions. Thus, the accelerator, the dispersant and the binder are not practically dispersed in the water and dispersed over a wide range during feeding of the spray material. Therefore, the spray material is not aggregated and thereby the amount of application water is not required to be increased. This makes it possible to eliminate the need for additionally adding an accelerator at the distal section and the need for managing an amount of accelerator to be added and performing a time-consuming operation of cleaning the spray-material feed pipe. In addition, a dense spray-applied product can be obtained by a low amount of application water.

In the present invention, the water particles having an average particle size of 100 μm or less are injected, and therefore a wetting effect is significantly high. Thus, in view of effectively adding application water while suppressing dissolving and dispersion of the accelerator, the dispersant and the binder, an ultrafine powder raw material having a large specific surface area of less than 10 μm is effective, and a balance with a raw material having a particle size of 10 to less than 75 μm is critical. Specifically, the mass ratio of the first group of the particles having a particle size of less than 10 μm to the second group of the particles having a particle size of 10 μm to less than 75 μm is preferably in the range of 0.25 to 0.7, more preferably in the range of 0.30 to 0.60 to obtain a denser spray-applied product. If the mass ratio is less than 0.25, the spray material is apt to be aggregated, and thereby the application water has to be increased. If the mass ratio exceeds 0.7, the spray material is likely to be attached on the inner surface of the spray-material feed pipe.

Further, if the content of the raw material having a particle size of less than 75 μm is less than 25 mass %, it is difficult to obtain a dense spray-applied product. If the content exceeds 60 mass %, the durability of a spray-applied product will deteriorate.

The fiber added to the cold spray material provides an advantage of suppressing attachment of the spray material on the inner surface of the spray-material feed pipe. The reason would be that the fiber-containing spray material during feeding is formed as an aggregate including a large volume of air and having a low bulk density, to facilitate air-carrying thereof and suppress the attachment on the inner surface of the spray-material feed pipe. Further, a spray-applied product becomes dense to effectively prevent explosive fracture.

As a more preferred cold spray material, a mixed composition comprises a mixture prepared by adding, with respect to 100 mass parts of refractory raw material powder, 1 to 7 mass parts of binder which is either one selected from the group consisting of alumina cement, magnesia cement, phosphate and silicate, 0.5 to 5 mass parts of accelerator, 0.01 to 0.5 mass parts of dispersant and 0.05 to 0.5 mass part of fiber, to the refractory raw material powder which includes 20 to 45 mass % of particles having a particle size of 1 to 5 mm, 10 to 40 mass % of particles having a particle size of 75 μm to less than 1 mm, and 25 to 60 mass % of particles having a particle size of less than 75 μm. In the refractory raw material powder, a mass ratio of a first group of the particles having a particle size of less than 10 μm to a second group of the particles having a particle size of 10 μm to less than 75 μm is in the range of 0.25 to 0.7.

The above description has been made about the cold spray material to be applied at a temperature of 600° C. or less. Secondly, the hot spray material to be applied in a temperature of 600° C. or more will be described. As a preferred the hot spray material, a mixed composition comprises a mixture prepared by adding a binder consisting of phosphate or silicate, and an accelerator to a refractory raw material powder which includes 10 to 45 mass % of particles having a particle size of less than 75 μm, and a mass ratio of a first group of the particles having a particle size of less than 10 μm to a second group of the particles having a particle size of 10 μm to less than 75 μm is in the range of 0.25 to 0.7.

While this hot spray material is similar to a type using phosphate or silicate as a binder, which is commonly used in the conventional dry application method, it has a feature in the above composition of the fine powder. Specifically, application water is injected into the spray-material feed pipe in the form of the water particles having an average particle size of 100 μm or less. Thus, the fine particle raw material having a particle size of 75 μm can be increased to a larger amount of 10 to 45 mass % as compared with a conventional wet spray material, to achieve an advantage of obtaining an remarkably dense spray-applied product.

As with the cold spray material, in the present invention, the water particles having an average particle size of 100 μm or less are injected to provide significantly high wetting effect. Thus, in view of effectively adding application water while suppressing dissolving and dispersion of the accelerator and the binder, an ultrafine powder raw material having a large specific surface area of less than 10 μm is effective, and a balance with a raw material having a particle size of 10 to less than 75 μm is critical. Specifically, the mass ratio of the first group of the particles having a particle size of less than 10 μm to the second group of the particles having a particle size of 10 μm to less than 75 μm is preferably in the range of 0.25 to 0.7, more preferably in the range of 0.30 to 0.60 to obtain a denser spray-applied product. If the mass ratio is less than 0.25, the spray material is apt to be aggregated, and thereby the application water has to be increased. If the mass ratio exceeds 0.7, the spray material is likely to be attached on the inner surface of the spray-material feed pipe.

As a more preferred hot spray material, a mixed composition comprises a mixture prepared by adding, with respect to 100 mass parts of refractory raw material powder, 1 to 7 mass parts of binder consisting of phosphate or silicate, and 0.5 to 5 mass parts of accelerator to the refractory raw material powder which includes 20 to 45 mass % of particles having a particle size of 1 to 5 mm, 20 to 45 mass % of particles having a particle size of 75 μm to less than 1 mm, and 10 to 45 mass % of particles having a particle size of less than 75 μm. In the refractory raw material powder, a mass ratio of a first group of the particles having a particle size of less than 10 μm to a second group of the particles having a particle size of 10 μm to less than 75 μm is in the range of 0.3 to 0.6.

According to a second aspect of the present invention, there is provided a spray material for used in the spray application method set forth in the first aspect of the present invention, which has an apparent porosity of 18 to 30% and a permeability of $100 \times 10^{-5}$ $cm^3 \cdot cm/cm^2 \cdot cm$ $H_2O$ sec or more, as measured in the form of an spray-applied product prepared by spray-applying the spray material at normal temperature, curing an obtained spray-applied body, and dying the cured spray-applied body at 110° C. for 24 hours or more. This spray material can provide a low water-content, dense spray-applied product excellent in resistance to explosive fracture. A spray material suitable for the spray application method of the present invention is designed based on the premise of low-water spray application. Thus, while the apparent porosity is lowered, explosive fracture is likely to occur during drying or spraying at high temperatures. From this point of view, relatively high permeability is given to the spray-applied product so as to prevent explosive fracture. If the apparent porosity is less than 18%, the spray-applied product becomes excessively dense to cause the risk of explosive fracture. If the apparent porosity is less than 30%, corrosive resistance will deteriorate. If the permeability is less than $100 \times 10^{-5}$ cm$^3$·cm/cm$^2$·cm H$_2$O·sec, explosive fracture is likely to occur. The spray material satisfying the above ranges can be obtained by optimizing the mix of particle size and/or adding an additive, such as fibers, for increasing a permeability. For example, a ratio of particles having a particle size of 75 μm or less may be adjusted to obtain a desired spray material. More specifically, the mass ratio of the first group of the particles having a particle size of less than 10 μm to the second group of the particles having a particle size of 10 μm to less than 75 μm may be set in the range of 0.3 to 0.6 to obtain a desired spray material.

Any type of refractory raw material for use in conventional monolithic refractory materials may be used as a refractory material powder for the spray material of the present invention, without problems. For example, the refractory material powder includes metal oxides, metal carbides, metal nitrides, carbons and metals. If refractory material powder has a maximum particle size of greater than 5 mm, separation or segregation is likely to occur during feeding after injection of water from the primary water injector, and cause deterioration in kneading effect. Thus, in the refractory material powder, particles of having a particle size of 5 mm or less is preferably set at 90 mass % or more. More preferably, in the refractory material powder, particles of having a particle size of 3 mm or less is preferably set at 90 mass % or more.

The binder for use in the cold spray material may be either one selected from the group consisting of alumina cement, magnesia cement, phosphate and silicate. In view of producing strength, alumina cement is more preferable.

The binder for use in the hot spray material may be either one of phosphate and silicate.

The dispersant is also termed deflocculant, and any type for use in conventional monolithic refractor materials may be used without problems. The dispersant has a function of providing flowability during spray application of a monolithic refractory material. As a specific example, the dispersant may include sodium tripolyphosphate, sodium hexametaphosphate, sodium ultrapolyphosphate, acid sodium hexametaphosphate, sodium borate, sodium carbonate, mineral salts such as polymetaphosphate, sodium citrate, sodium tartrate, sodium polyacrylate, sodium sulfonate, polycarboxylate, β-aphthalenesulfonate salts, naphthalenesulfonate, and carboxylic polyether-based dispersant.

The accelerator is operable to react with the binder in the presence of application water so as to quickly cure a monolithic refractory material and provide adhesion to the monolithic refractory material. The accelerator may be initially mixed in a monolithic refractory material, in a powder form or may be added in the vicinity of the spray nozzle and before a position for injecting secondary application water. When the accelerator is added at or in the vicinity of the spray nozzle, a liquid prepared by diluting the accelerator with water may be used according to need.

As a specific example, the accelerator may include: silicates such as sodium silicate and potassium silicate; aluminates such as sodium aluminate, potassium aluminate and calcium aluminate; carbonates such as sodium carbonate, potassium carbonate and sodium hydrogen carbonate; sulfates such as sodium sulfate, potassium sulfate and magnesium sulfate; calcium-aluminate compounds such as CaO.Al$_2$O$_3$, 12CaO.7Al$_2$O$_3$, CaO.2Al$_2$O$_3$, 3CaO.Al$_2$O$_3$, 3CaO.3Al$_2$O$_3$.CaF$_2$ and 11CaO.7Al$_2$O$_3$.CaF$_2$; and calcium salts such as calcium oxide, calcium hydroxide and calcium chloride.

As the accelerator for use in the cold spray material of the present invention, sodium aluminate and slaked lime both in a powder form are more preferably in view of providing enhanced strength to a spray-applied product. As the accelerator for use in the hot spray material of the present invention, slaked lime, activated magnesia and sulfate each in a powder form are more preferably in view of providing enhanced strength to a spray-applied product.

The fiber may be any type used for preventing explosive fracture or the like in conventional monolithic refractor materials, such as vinylon, nylon, PVA, polyvinyl, polystyrene, polypropylene and carbon.

As above, the water particles having an average particle size of 100 μm or less are injected into the spray-material feed pipe to obtain excellent kneading effect by a low amount of application water. This makes it possible to obtain a dense spray-applied product with reduced variation and provide enhanced durability to a furnace. This also makes it possible to eliminate the need for being equipped with a particular kneading device, such as a mixer, and the risk of clogging of the spray-material feed pipe, so as to reduce a trouble during spray application and a load of a cleaning operation to provide a spray application method with significantly enhanced operational efficiency.

The spray material may consist of an alumina-silicon carbide-based monolithic refractory material containing 5 to 30 mass % of silicon carbide having a particle size of 75 μm or less. This spray material has excellent affinity for the application water as compared with the conventional spray application method. Thus, when application water is added in the spray-material feed pipe, the monolithic refractory material and the application water are sufficiently mixed to provide enhanced adhesion while suppressing dust generation. Further, a spray-applied product can have enhanced density.

The spray material may consist of an alumina-magnesia-based monolithic refractory material comprising a primary component of 1 to 30 mass % of magnesia fine powder, with the remainder being alumina. This spray material makes it possible to suppress hydration of a spray-applied product and facilitate formation of a spinel in the spray-applied product. Thus, advantages of the alumina-magnesia-based monolithic refractory material, such as volumetric stability and corrosion resistance, can be fully exerted to provide remarkably enhanced durability to the spray-applied product.

The spray material may comprise a mixture prepared by adding a binder which is either one selected from the group consisting of alumina cement, magnesia cement, phosphate and silicate, an accelerator, a dispersant and a fiber to a refractory raw material powder which includes 25 to 60 mass % of particles having a particle size of less than 75 μm. Further, a mass ratio of a first group of the particles having a particle size of less than 10 μm to a second group of the particles having a particle size of 10 μm to less than 75 μm is in the range of 0.25 to 0.7. This spray material makes it possible to perform adequate kneading by a smaller amount of added water as compared with the conventional wet application method, so as to obtain a high-quality spray-applied product with reduced variation and provide enhanced durability to a furnace. This spray material also makes it possible to reduce the need for managing an amount of accelerator to be added and performing a time-consuming operation of cleaning the spray-material feed pipe as in the conventional method, so as to provide enhanced operational efficiency.

The spray material may comprise a mixture prepared by adding a binder consisting of phosphate or silicate, and an accelerator to a refractory raw material powder which includes 10 to 45 mass % of particles having a particle size of less than 75 μm. Further, a mass ratio of a first group of the particles having a particle size of less than 10 μm to a second group of the particles having a particle size of 10 μm to less than 75 μm is in the range of 0.25 to 0.7. This spray material makes it possible to perform adequate kneading by a smaller amount of added water as compared with the conventional wet application method, so as to obtain a high-quality spray-applied product with reduced variation and provide enhanced durability to a furnace. This spray material also makes it possible to provide enhanced operational efficiency without the need for being equipped with a complicated special mixer.

BRIEF DESCRIPTION OF DRAWINGS

FIG. 5 is a graph showing a relationship between an average particle size of water particles in a primary water injector and a density of a monolithic refractory spray-applied product.

BEST MODE FOR CARRYING OUT THE INVENTION

The present invention will now be described based on examples.

Example 1

Figure 1:
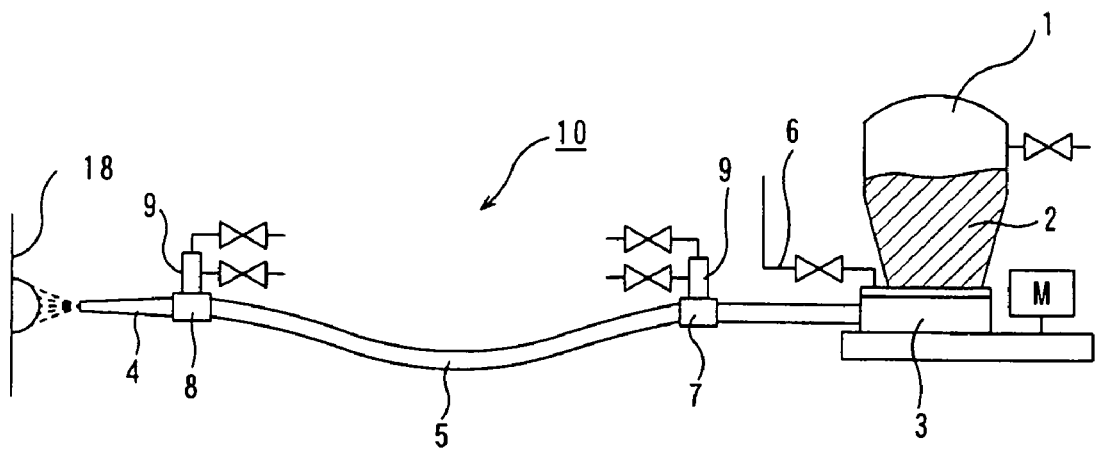
FIG. 1 is a schematic diagram generally showing a spray appreciation apparatus according to one embodiment of the present invention.

FIG. 1 generally shows an apparatus 10 using a spray application method for a monolithic refractory material according to the present invention.

In FIG. 1, the reference numeral 1 indicates a spray-material supply device containing a spray material 2. The spray-material supply device 1 may be any type used in a conventional spray application apparatus for a monolithic refractory material and adapted to quantitatively discharge a spray material therefrom, such as a rotektor gun, a lead gun and a nogami cement gun.

The spray-material supply device 1 is designed to be supplied with compressed air so as to adjust an inner pressure thereof, and provided with a table feeder 3 adapted to be driven by a motor M disposed at a lower end thereof. The table feeder 3 is operable to discharge the spray material 2 contained in the spray-material supply device 1 into a feed hose 5 extending from the spray-material supply device 1 to a distal spray nozzle 4.

Carrier air is supplied from a carrier-air feed section 6 of the table feeder 3 into the feed hose 5 to allow the spray material 2 from the spray-material supply device 1 to be spray-applied from the distal spray nozzle 4 onto a target object 18.

A primary water injector 7 is arranged in the feed hose 5 at a position just after the spray-material supply device 1, and a secondary water injector 8 is arranged in the feed hose 5 at a position just before the distal spray nozzle 4.

The primary water injector 7 and the secondary water injector 8 are operable to inject, in a two-stage manner, water particles into the spray material which is being air-carried (i.e., fed in an air-carried manner) through the feed hose 5, so as to wet the spray material.

Figure 2:
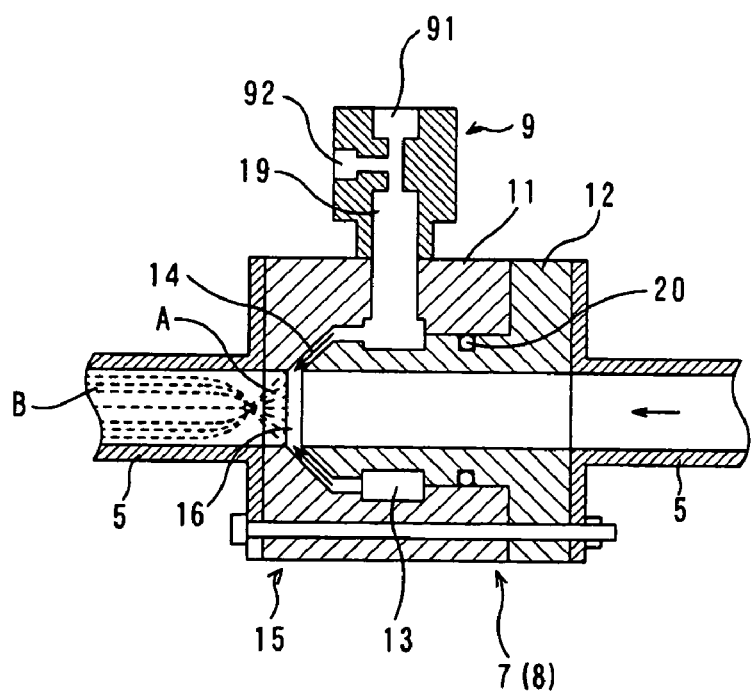
FIG. 2 is a schematic diagram showing a water injector of the spray appreciation apparatus in FIG. 1.

FIG. 2 is a sectional view showing the structure of a water injector, taken along the feed hose 5. The primary water injector 7 and the secondary water injector 8 illustrated in FIG. 1 may use this structure in common. The water injector comprises a nozzle body 15 and a premixing gas-liquid mixer 9.

The gas-liquid mixer 9 is formed as a spray nozzle structure which has a compressed-air inlet port 91 extending vertically and an application-water inlet port 92 extending in a direction orthogonal to the compressed-air inlet port 91.

The gas-liquid mixer 9 is adapted to generate mist-like water droplets in a mixing chamber 19 thereof. Specifically, pressurized water introduced from the application-water inlet port 92 is mixed with compressed air introduced through the compressed-air inlet port 91 at a pressure greater than that of the application water, and thereby formed into water droplets. The gas-liquid mixer 9 is provided as a means to generate a mixture of air and water formed as droplets. The gas-liquid mixer 9 is not limited to the structure in this embodiment, but may be any other conventional gas-liquid mixer.

The nozzle body 15 for injecting water particles includes an outer tube 11 and an inner tube 12 installed inside the outer tube 11. The nozzle body 15 is interposed in the feed hose 5 and fixed thereto using a bolt penetrating through the nozzle body 15. The nozzle body 15 has an inner hole which allows the spray material fed in an air-carried manner in a direction indicated by the arrow in FIG. 2 (this direction will hereinafter be referred to as "air-carrying direction") to pass therethrough. The nozzle body 15 also has a pressure equalization chamber 13 between the outer tube 11 and inner tube 12 to continuously extend in a circumferential direction thereof. The pressure equalization chamber 13 serves as a buffer space for equalizing a pressure of the air-water mixture so as to allow the pressurized mist-like water droplets from the gas-liquid mixer 9 to be uniformly injected into the feed hose from an after-mentioned nozzle hole for generating water particles. The mixing chamber 19 of the gas-liquid mixer 9 is formed to communicate with the pressure equalization chamber 13.

Figure 3:
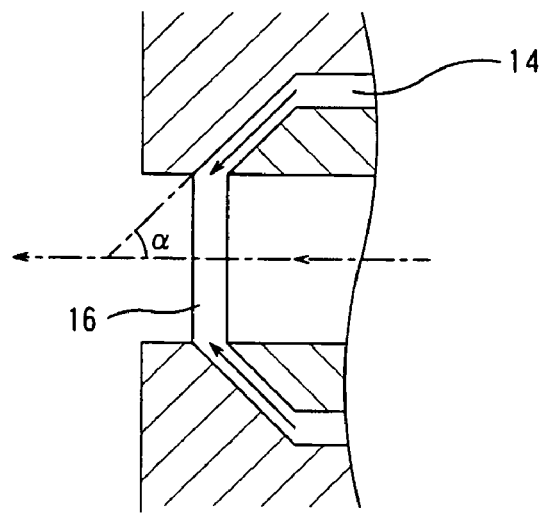
FIG. 3 is an explanatory diagram of an inclination angle of a nozzle hole of the water injector in FIG. 2.

The nozzle body 15 is formed with a nozzle hole 14 at a downstream end of the pressure equalization chamber 13 to generate water particles. The nozzle hole 14 is formed as a space defined between an outer surface of a downstream end of the inner tube 12 having an outer diameter which decreases in the air-carrying direction, and an inner surface of the outer tube 11 disposed opposed to the outer surface of the inner tube 12 with an approximately even distance therebetween. The nozzle hole 14 has a single slit shape continuously extending in a circumferential direction of the inner hole. Specifically, as shown in FIG. 3, the nozzle hole 14 is formed to extend toward an axis of the feed hose 5 at an inclination angle α of 30 to 70 degrees relative to the air-carrying direction of the spray material indicated by the arrow in FIG. 3. The nozzle hole in this embodiment has a width of 0.5 mm at an opening 16 and the slit thereof, and a length of 15 mm. Each of the inner tube 12 and the outer tube 11 may be made of ceramic to provide wear resistance and facilitate stable formation of water particles having an average particle size of 100 μm or less. The nozzle body 15 is designed such that the distance between the inner tube 12 and the outer tube 11 is freely adjusted to change the respective widths of the opening 16 and the slit of the nozzle hole.

In the nozzle body 15, the inner surface of the outer tube 11 and the outer surface of the inner tube 12 on an upstream side relative to the pressure equalization chamber 13 are in contact with each other, and sealed by an O-ring 20 disposed therebetween. An inner surface of the nozzle hole defined by the outer tube 11 and the inner tube 12 are formed with a spiral concavo-convex portion. This spiral concavo-convex portion allows water particles after being injected to be spirally swirled in the feed hose so as to increase the frequency of contact with the spray material and evenly wet the spray material.

FIG. 2 schematically shown a behavior of water particles based on an experimental test wherein a state of water particles injected by supplying pressurized water and compressed air to the water injector was observed through a pair of transparent tube connected, respectively, to opposite ends of the water injector, under the condition that no spray material is introduced in the water injector. As seen in FIG. 2, water particles injected in an umbrella pattern collide with each other approximately on an axis of the transparent tube (feed hose), and then flow approximately parallel to each other to form a parallel water-particle flow. Even if spray-material carrying air is supplied in this state, the umbrella-shaped water particles and the parallel water-particle flow on a downstream side thereof are formed although the center of the collision becomes unclear.

Figure 4:
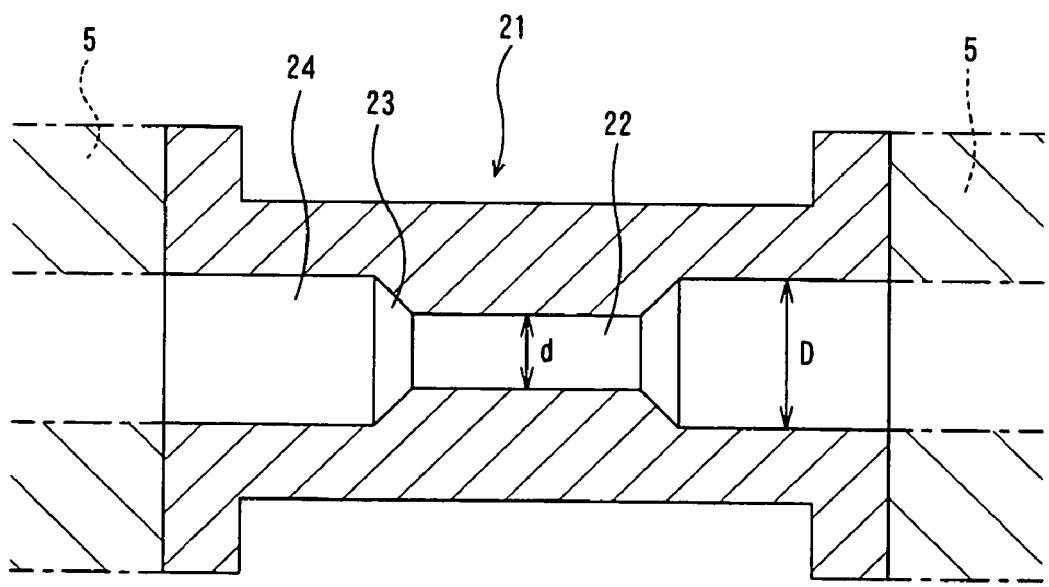
FIG. 4 is a sectional view showing a mixing pipe.

FIG. 4 shows a mixing tube for use in the present invention. This mixing tube 21 is a cylindrical tube having opposite ends each formed as a flange. The mixing tube 21 has an inner hole which includes a narrowed portion 22 having an inner diameter less than an inner diameter D of the spray-material feed pipe 5, two inverse-taper portions 23 each extending from a corresponding one of opposite edges of the narrowed portion 22, and two straight portions 24 each extending from a corresponding one of respective edges the tapered portions 23 and having the same inner diameter as the inner diameter D of the spray-material feed pipe 5. The inner diameter d of the narrowed portion is set in the range of 0.5 D to 0.9 D relative to the inner diameter D of the spray-material feed pipe 5. This mixing tube may be provided on at least one of upstream and downstream sides of the secondary water injector. The mixing tube arranged on at least one of the upstream and downstream sides of the secondary water injector makes it possible to provide enhanced kneading effect so as to obtain a spray-applied product with reduced variation.

A spray application using the spray application apparatus 10 illustrated in the above figures is performed according to the following process.

Firstly, as with the conventional dry spray application method, the spray material in the spray-material supply device 1 is fed through the feed hose in an air-carried manner by carrier-air from the carrier-air feed section 6. Simultaneously, water particles are injected from the primary water injector 7 and the secondary injector 8 into the spray material which is being air-carried. During this process, in each of the water injectors, pressurized water and compressed air having a pressure greater than that of the pressurized water are supplied, respectively, through the application-water inlet port 92 and the compressed-air inlet port 91 to generate mist-like water droplets. The mist-like water droplets are supplied to the nozzle hole together with the compressed air, and injected from the nozzle hole into a spray-material feed passage in the form of water particles having an average particle size of 100 μm or less.

Then, the distal spray nozzle is operated to spray sufficiently kneaded monolithic refractory material onto the target object, such as a wall of a furnace.

In view of a desired kneading effect, a distance between the primary water injector 7 and the secondary water injector 8 illustrated in FIG. 1 is set preferably at 15 m or more.

The secondary water injector is arranged at a position apart from a distal end of the spray-material feed passage by a distance, preferably, of 0.5 to less than 5 m, more preferably 0.5 to less than 3 m. If the distance is less than 0.5 m, the water particles and the spray material are not sufficiently kneaded. If the distance exceeds 5 m, the feed hose or the distal spray nozzle is likely to be clogged.

Tables 1 and 2 show the result of a spray test using the spray application apparatus illustrated in the above figures and a spray material shown in Tables 1 and 2. This spray test was performed under the following conditions. A position of the primary water injector from the end of the spray-material feed passage: 20 m; a position of the secondary water injector from the end of the spray-material feed passage: 1.7 m; a length of the distal spray nozzle: 1.5 m; a flow volume of the spray-material-carrying air: 5 Nm³/min; a pressure of the spray-material-carrying air: 0.27 MPa; a flow velocity of the spray-material carrying air just before the primary water injector: 23 m/sec; a flow volume of the water-particle-injecting air in the primary water injector: 250 NL/min; a flow velocity of the water-particle-injecting air in the primary water injector: 30 m/sec; a flow volume of the water-particle-injecting air in the secondary water injector: 250 NL/min; a flow velocity of the water-particle-injecting air in the secondary water injector: 30 m/sec; a width of the opening of the nozzle hole: 0.5 mm; an inner diameter of the spray-material feed pipe: 35 mm; and an initial pressure of water to be supplied to each of the water injectors: 0.38 MPa. Under the above conditions and the condition that only the spray-material-carrying air was supplied without feeding the spray material, an average particle size of the water particles measured using a laser Doppler technique was 40 μm (volumetric-average particle size). This average particle size was measured at a position apart from the opening of the nozzle hole on the downstream side by 300 mm, using a measurement device: trade name "AEROMETRICS" of TSI Inc., USA.

TABLE 1

| | Inventive Example 1 | Comparative Example 1 | Comparative Example 2 | Comparative Example 3 |
|---|---|---|---|---|
| Chemical component (mass %) | | | | |
| Al₂O₃ | 70 | 70 | 70 | 70 |
| SiC | 25 | 25 | 25 | 25 |
| C | 2 | 2 | 2 | 2 |
| Accelerator | powder mixing in mixed powder | powder mixing in mixed powder | powder mixing in mixed powder | solution adding from distal nozzle |
| Application water (mass %, with respect to 100 mass % of total water) | | | | |
| Primary injection water | 2 | 9 | 2 | |
| Secondary injection water | 5 | | 7 | |
| Kneading water | | | | 6.5 |
| Accelerator + water | | | | 0.5 |

TABLE 1-continued

|  | Inventive Example 1 | Comparative Example 1 | Comparative Example 2 | Comparative Example 3 |
|---|---|---|---|---|
| Bulk specific gravity | 2.8 | Application NG due to clogging of feed pipe | 2.69 | 2.82 |
| Variation of bulk specific gravity | 0.03 |  | 0.1 | 0.03 |
| Apparent porosity (%) | 22 |  | 26 | 21 |
| Bending Strength (Mpa) | 4.2 |  | 2.2 | 4.7 |
| Rotary erosion test | 100 |  | 120 | 100 |
| During spraying operation |  |  |  |  |
| Dust generation | Non |  | Generated | Non |
| Rebound | Low |  | Low | Non |
| Hose after spraying operation | Almost No attachment | Attachment | Attachment | Clogging |

Note 1)
The variation of bulk specific gravity was measured by N number = 5, and expressed by a difference between maximum and minimum values.
Note 2)
The result of the rotary erosion test was expressed by an index calculated on the basis that the number of eroded sample in Comparative Example 3 is 100 (lower value indicates better corrosion resistance).

TABLE 2

|  |  |  | Ratio (mass %) | |
|---|---|---|---|---|
|  | Raw Material | Particle Size | Inventive Example 1 & Comparative Examples 1 and 2 | Comparative Example 3 |
| Refractory raw material powder | fused alumina | 5 to 1 mm | 45 | 45 |
|  | silicon carbide | 1 mm or less | 50 | 50 |
|  | calcinate alumina | 0.1 mm or less |  |  |
| Binder | alumina cement | 0.1 mm or less | 3 | 3 |
| Dispersant | phosphate | 0.1 mm or less | <1 | <1 |
| Accelerator | sodium aluminate | 0.1 mm or less | <1 |  |
|  | sodium aluminate | aqueous solution |  | <1 |

In Tables 1 and 2, Comparative Example 1 shows the result using the spray application apparatus in the above embodiment which was modified such that the entire application water is injected from the primary water injector using. Comparative Example 2 shows the result using the same spray application apparatus as that in the above embodiment except that a sectional area of the nozzle hole is reduced to inject simple high-pressure water which is not water particles. Comparative Example 3 shows the result obtained by the conventional wet application method using a conventional apparatus designed such that a spray material kneaded by a mixer is pressure-fed by a pressure-feed pump, and then an accelerator is added at a distal spray nozzle. In Inventive Examples and Comparative Example 1 and 2, a mixed composition prepared by pre-mixing an accelerator in a powder form with other raw materials was used.

The test was performed by horizontally spray-applying a spray material onto a metal frame (depth: 40 mm, width: 160 mm, a length; 400 mm) disposed at a position apart from the distal spray nozzle by about 1 m, to extend vertically, and checking a quality of a spray-applied product after being dried at 110° C. A rotary erosion test was performed under the condition of 1550° C.×4 hours, using blast-furnace slugs, and remaining thicknesses of test pieces was compared with each other.

As the result of the test, in Comparative Example 1 where the entire application water was injected from the primary water injector, the spray material was slurried during feeding, and stuck in the spray-material feed pipe to preclude a spray application.

In Comparative Example 2 where only water was added without using compressed air, an amount of application water has to be increased to reduce a rebound loss and ensure adequate operational efficiency, and consequently a quality of a spray applied product deteriorated.

As compared with Comparative Example 3 which is the conventional spray application method, Inventive Example 1 allowed a spray application to be performed by the same amount of application water, and had approximately the same quality of a spray-applied product.

The result of a spray test performed using a test sample having a mixing ratio as shown in Table 3 under the spray-application condition in Inventive Example 1 will be described below. The permeability was measured according to JIS R2115. Table 3 shows an example of a cold spray material, and the result of an evaluation on an impact of fine particles on a spray-applied product, in an alumina-silicon carbide-based spray material using a refractory raw material powder consisting of 10 mass % of silicon carbide having a particle size of 75 μm or less, with the remainder being alumina. Each of binder, accelerator and dispersant was used in a powder form, and evenly mixed with a refractory raw material powder and a fiber in advance to prepare a mixed composition. In each of Inventive Examples 2 to 5 where a mass ratio of a first group of particles having a particle size of less than 10 μm to a second group of particles having a particle size of 10 μm to less than 75 μm in the raw material powder falls within in the range defined in the present invention, a low water-content, dense spray-applied product could be obtained. In Comparative Example 4 where the mass ratio of the first group (less than 10 μm) to the second group (10 μm to less than 75 μm) is set at a low value of 0.2, the accelerator was apt to be aggregated, and therefore an amount of application water had to be increased. As the result, a dense spray-applied product could not be obtained. In Comparative Example 5 where the mass ratio of the first group (less than 10 μm) to the second group (10 μm to less than 75 μm) is set at a large value of 0.75, the spray-material feed pipe was apt to be clogged, and therefore the sprayed material was unstably sprayed. As the result, an adequate dense spray-applied product could not be obtained. In each of Inventive Examples 6 to 9 where a ratio of particles having a particle size of less than 75 μm in the raw material powder falls within in the range defined in the present invention, a low water-content, dense spray-applied product could be obtained. In Comparative Example 6 where the ratio of particles having a particle size of less than 75 μm is set at a small value out of the range defined in the present invention, a spray-applied material had poor strength. In Comparative Example 7 where the ratio of particles having a particle size of less than 75 μm is set at a large value out of the range defined in the present invention, a spray-applied material had poor corrosion resistance.

10 to 17 where a mass ratio of a first group of particles having a particle size of less than 10 μm to a second group of particles having a particle size of 10 μm to less than 75 μm in the raw material powder falls within in the range defined in the present invention, a low water-content, dense spray-applied product could be obtained. In Comparative Example 8 where the mass ratio of the first group (less than 10 μm) to the second group (10 μm to less than 75 μm) is set at a low value of 0.2, the accelerator was apt to be aggregated, and therefore an amount of application water had to be increased. As the result, a dense spray-applied product could not be obtained. In Comparative Example 9 where the mass ratio of the first group (less than 10 μm) to the second group (10 μm to less than 75 μm) is set at a large value of 0.8, the spray-material feed pipe was apt to be clogged, and therefore the sprayed material was unstably sprayed. As the result, an adequate dense spray-applied product could not be obtained. In each of Inventive

TABLE 3

| | | Inventive Example | | | | | | | | Comparative Example | | | |
|---|---|---|---|---|---|---|---|---|---|---|---|---|---|
| | | 2 | 3 | 4 | 5 | 6 | 7 | 8 | 9 | 4 | 5 | 6 | 7 |
| Binder (mass part) | alumina cement | 3 | 3 | 3 | 3 | 3 | 3 | 3 | 3 | 3 | 3 | 3 | 3 |
| Acelerator (mass part) | sodium aluminate | 0.5 | 0.5 | 0.5 | 0.5 | 0.5 | 0.5 | 0.5 | 0.5 | 0.5 | 0.5 | 0.5 | 0.5 |
| Dispersant (mass part) | sodium tripolyphosphate | 0.1 | 0.1 | 0.1 | 0.1 | 0.1 | 0.1 | 0.1 | 0.1 | 0.1 | 0.1 | 0.1 | 0.1 |
| Fiber (mass part) | vinylon | 0.1 | 0.1 | 0.1 | 0.1 | 0.1 | 0.1 | 0.1 | 0.1 | 0.1 | 0.1 | 0.1 | 0.1 |
| Refractory raw material powder (mass %) | 5 to 1 mm | 35 | 35 | 35 | 35 | 35 | 35 | 35 | 35 | 80 | 35 | 76 | 35 |
| | 1 mm to 75 μm | 25 | 25 | 25 | 25 | 35 | 30 | 20 | 5 | 0 | 25 | 4 | 0 |
| | less than 75 μm | 40 | 40 | 40 | 40 | 30 | 35 | 45 | 60 | 20 | 40 | 20 | 65 |
| | A: 75 to 10 μm | 31 | 29 | 27 | 25 | 21 | 25 | 32 | 43 | 17 | 23 | 14 | 46 |
| | B: 10 μm or less | 9 | 11 | 13 | 15 | 9 | 10 | 13 | 17 | 3 | 17 | 6 | 19 |
| | B/A | 0.3 | 0.4 | 0.5 | 0.6 | 0.4 | 0.4 | 0.4 | 0.4 | 0.2 | 0.75 | 0.4 | 0.4 |
| Application water (mass part) | Primary injection water | 2.3 | 2.3 | 2.3 | 2.3 | 2.3 | 2.3 | 2.3 | 2.3 | 2.3 | 2.3 | 2.3 | 2.3 |
| | Secondary injection water | 6.2 | 6.3 | 6.5 | 7 | 6.2 | 6.2 | 6.6 | 7.2 | 8.5 | 9.3 | 8.3 | 8.9 |
| Bulk specific gravity | | 2.80 | 2.78 | 2.78 | 2.75 | 2.74 | 2.82 | 2.78 | 2.75 | 2.66 | 2.60 | 2.66 | 2.71 |
| Apparent porosity (%) | | 21.9 | 22.1 | 22.9 | 23.1 | 22.5 | 21.8 | 22.8 | 23.8 | 25.1 | 26.8 | 24.7 | 25.5 |
| Bending Strength (Mpa) | | 4.1 | 4.5 | 5.3 | 5.0 | 3.8 | 4.0 | 5.2 | 4.9 | 2.8 | 2.0 | 3.0 | 3.8 |
| Rotary erosion test | Erosion index | 86 | 86 | 88 | 92 | 90 | 84 | 88 | 91 | 100 | 105 | 100 | 101 |
| Permeability ($\times 10^{-5}$ cm$^3$ · cm/cm$^2$ · cmH$_2$O · sec) | | 132 | 425 | 250 | — | 685 | — | — | — | 52 | — | 59 | — |

Note 1)
The result of the rotary erosion test was expressed by an index calculated on the basis that the number of eroded sample in Comparative Example 4 is 100 (lower value indicates better corrosion resistance).

The result of a spray test performed using a test sample having a mixing ratio as shown in Table 4 under the spray-application condition in Inventive Example 1 will be described below. The permeability was measured according to JISR2115. Table 4 shows an example of a hot spray material, and the result of an evaluation on an impact of fine particles on a spray-applied product, in an alumina-magnesia-based spray material using a refractory raw material powder consisting of 10 mass % of magnesia having a particle size of 75 μm or less, with the remainder being alumina. Each of binder and accelerator was used in a powder form, and evenly mixed with a refractory raw material powder in advance to prepare a mixed composition. In each of Inventive Examples 14 to 17 where a ratio of particles having a particle size of less than 75 μm in the raw material powder falls within in the range defined in the present invention, a low water-content, dense spray-applied product could be obtained. In Comparative Example 10 where the ratio of particles having a particle size of less than 75 μm is set at a small value out of the range defined in the present invention, a spray-applied material had poor strength. In Comparative Example 11 where the ratio of particles having a particle size of less than 75 μm is set at a large value out of the range defined in the present invention, a spray-applied material had poor corrosion resistance.

TABLE 4

|  |  | Inventive Example |  |  |  |  |  |  |  | Comparative Example |  |  |  |
|---|---|---|---|---|---|---|---|---|---|---|---|---|---|
|  |  | 10 | 11 | 12 | 13 | 14 | 15 | 16 | 17 | 8 | 9 | 10 | 11 |
| Binder (mass part) | silicate | 3 | 3 | 3 | 3 | 3 | 3 | 3 | 3 | 3 | 3 | 3 | 3 |
| Accelerator (mass part) | slaked lime | 0.8 | 0.8 | 0.8 | 0.8 | 0.8 | 0.8 | 0.8 | 0.8 | 0.8 | 0.8 | 0.8 | 0.8 |
| Refractory raw material powder (mass %) | 5 to 1 mm | 35 | 35 | 35 | 35 | 58 | 35 | 35 | 35 | 50 | 35 | 85 | 35 |
|  | 1 mm to 75 µm | 35 | 35 | 35 | 35 | 32 | 45 | 30 | 20 | 40 | 35 | 10 | 15 |
|  | less than 75 µm | 30 | 30 | 30 | 30 | 10 | 20 | 35 | 45 | 10 | 30 | 5 | 50 |
|  | A: 75 to 10 µm | 23 | 21 | 20 | 19 | 7 | 14 | 25 | 32 | 8 | 17 | 4 | 36 |
|  | B: 10 µm or less | 7 | 9 | 10 | 11 | 3 | 6 | 10 | 13 | 2 | 13 | 1 | 14 |
|  | B/A | 0.3 | 0.4 | 0.5 | 0.6 | 0.4 | 0.4 | 0.4 | 0.4 | 0.2 | 0.8 | 0.4 | 0.4 |
| Application water (mass part) | Primary injection water | 2.5 | 2.5 | 2.5 | 2.5 | 2.5 | 2.5 | 2.5 | 2.5 | 2.5 | 2.5 | 2.5 | 2.5 |
|  | Secondary injection water | 6.8 | 6.9 | 7.0 | 7.0 | 7.2 | 6.7 | 7.1 | 7.5 | 8.9 | 10.0 | 9.2 | 8.8 |
| Bulk specific gravity |  | 2.70 | 2.69 | 2.65 | 2.65 | 2.64 | 2.74 | 2.65 | 2.62 | 2.48 | 2.35 | 2.39 | 2.40 |
| Apparent porosity (%) |  | 22.6 | 23.0 | 23.5 | 23.3 | 23.5 | 21.8 | 23.1 | 23.9 | 26.8 | 28.8 | 28.0 | 28.0 |
| Bending Strength (Mpa) |  | 4.33 | 4.20 | 4.25 | 4.21 | 3.86 | 3.92 | 4.10 | 4.25 | 3.01 | 2.75 | 2.88 | 3.48 |
| Rotary erosion test | Erosion index | 91 | 96 | 96 | 95 | 97 | 90 | 94 | 95 | 100 | 110 | 106 | 104 |
| Permeability ($\times 10^{-5}$ cm$^3$ · cm/cm$^2$ · cmH$_2$O · sec) |  | 150 | 504 | 302 | — | 752 | — | — | — | 75 | — | 83 | — |

Note 1)
The result of the rotary erosion test was expressed by an index calculated on the basis that the number of eroded sample in Comparative Example 8 is 100 (lower value indicates better corrosion resistance).

Figure 5:
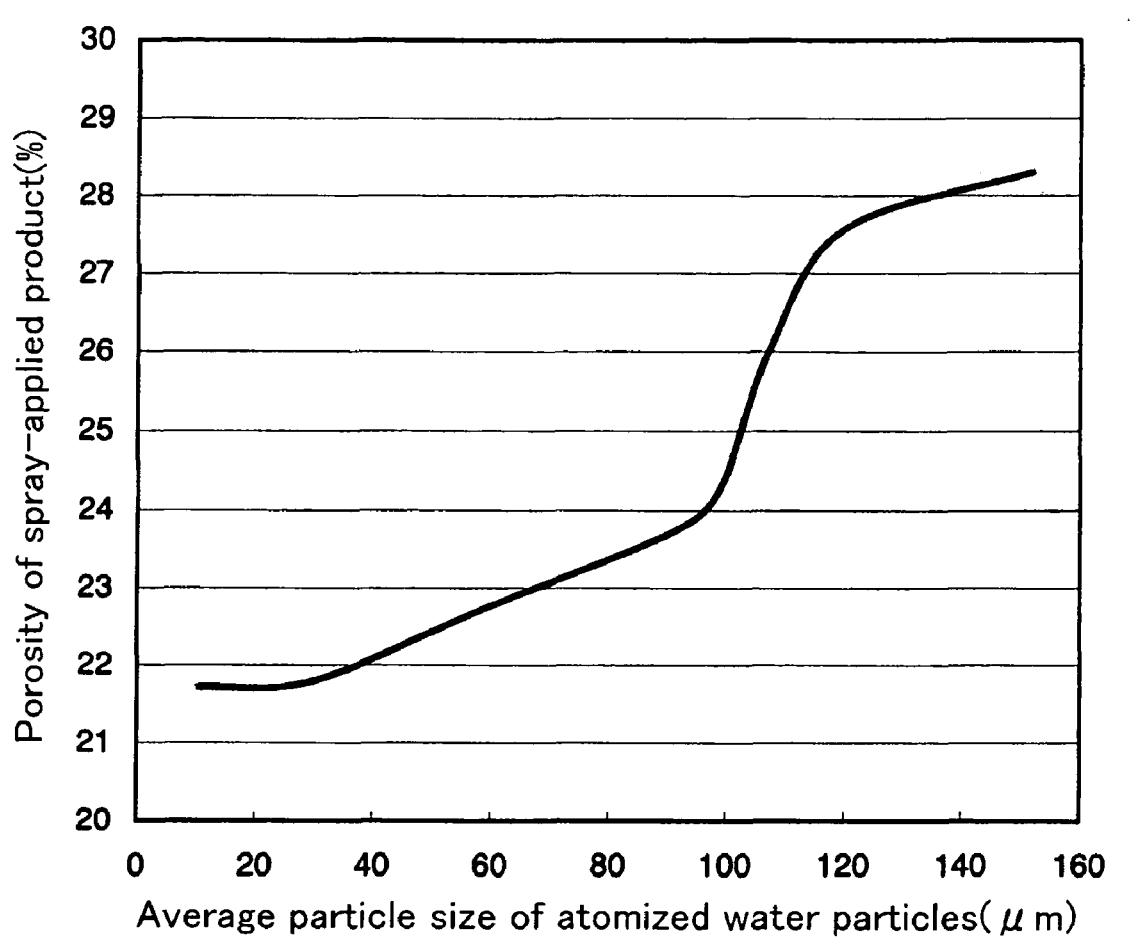

FIG. 5 is a graph showing a relationship between an average particle size of water particles in the primary water injector and a porosity of a monolithic refractory spray-applied product. This test was performed based on Inventive Example 1 shown in Table 1 by changing only the average particle size of water particles in the primary water injector while maintaining the remaining conditions of Inventive Example 1, and measuring porosity of an obtained monolithic refractory spray-applied product. As is evident from this graph, a density of the spray-applied product using the water particles defined in the present invention is effectively improved.

INDUSTRIAL APPLICABILITY

The present invention is suitably used for repairing and building of regions of various types of metallurgical furnaces and ceramic furnaces.

DESCRIPTION OF THE REFERENCE NUMERALS AND SIGNS 1. spray-material supply device
2. spray material
3. table feeder
4. distal spray nozzle
5. feed hose
6. carrier-air feed section
7. primary water injector
8. secondary water injector
9. gas-liquid mixer
91. compressed-air inlet port
92. application-water inlet port
10. spray application apparatus
11. outer tube
12. inner tube
13. pressure equalization chamber
14. nozzle hole
15. nozzle body
16. opening
18. target object
19. mixing chamber

What is claimed is:

1. A method for spray application of a monolithic refractory material, including providing a primary water injector arranged in a spray-material feed pipe extending from a spray-material supply device to a distal spray nozzle, and a secondary water injector arranged in said spray-material feed pipe at a position adjacent to said distal spray nozzle, and injecting application water from each of said primary and secondary water injectors into a spray material which is being fed through said spray-material feed pipe, said method comprising:

arranging said primary water injector on an upstream side of said secondary water injector with a given distance therebetween;

adding 10 to 50 mass % of application water on the basis of the total mass % of application water required for said spray application from said primary water injector; and adding the remaining mass % of application water from said secondary water injector, wherein said application water added from said primary water injector is injected together with compressed air in the form of water particles having an average particle size of 100 µm or less; and wherein said spray material is a cold/hot spray material to be applied in a cold or hot temperature, said cold/hot spray material comprising a mixture prepared by adding a binder which is either one selected from the group consisting of alumina cement, magnesia cement, phosphate and silicate, an accelerator, a dispersant and a fiber to a refractory raw material powder, said refractory raw material powder including 25 to 60 mass % of particles having a particle size of less than 75 μm, wherein a mass ratio of a first group of said particles having a particle size of less than 10 μm to a second group of said particles having a particle size of 10 μm to less than 75 μm is in the range of 0.25 to 0.7.

2. The method as defined in claim 1, wherein said binder consists of alumina cement, and said accelerator consists of sodium aluminate or slaked lime, each of said binder and said accelerator being in a powder form.

3. The method according to claim 2, wherein said application water added from said secondary water injector is injected together with compressed air in the form of water particles having an average particle size of 100 μM or less, in the same manner as that in said primary water injector.

4. The method according to claim 1, wherein said application water added from said secondary water injector is injected together with compressed air in the form of water particles having an average particle size of 100 μm or less, in the same manner as that in said primary water injector.

5. A method for spray application of a monolithic refractory material, including providing a primary water injector arranged in a spray-material feed pipe extending from a spray-material supply device to a distal spray nozzle, and a secondary water injector arranged in said spray-material feed pipe at a position adjacent to said distal spray nozzle, and injecting application water from each of said primary and secondary water injectors into a spray material which is being fed through said spray-material feed pipe, said method comprising:

arranging said primary water injector on an upstream side of said secondary water injector with a given distance therebetween;

adding 10 to 50 mass % of application water on the basis of the total mass % of application water required for said spray application from said primary water injector; and adding the remaining mass % of application water from said secondary water injector, wherein said application water added from said primary water injector is injected together with compressed air in the form of water particles having an average particle size of 100 μm or less; and wherein said spray material is a hot spray material to be applied in a hot temperature, said hot spray material comprising a mixture prepared by adding a binder consisting of phosphate or silicate, and an accelerator to a refractory raw material powder, said refractory raw material powder including 10 to 45 mass % of particles having a particle size of less than 75 μm, wherein a mass ratio of a first group of said particles having a particle size of less than 10 μm to a second group of said particles having a particle size of 10 μm to less than 75 μm is in the range of 0.25 to 0.7.

6. The method according to claim 5, wherein said binder is phosphate or silicate, and said accelerator is either one selected from the group consisting of slaked lime, activated magnesia and sulfate, each of said binder and said accelerator being in a powder form.

7. The method according to claim 6, wherein said application water added from said secondary water injector is injected together with compressed air in the form of water particles having an average particle size of 100 μm or less, in the same manner as that in said primary water injector.

8. The method according to claim 5, wherein said application water added from said secondary water injector is injected together with compressed air in the form of water particles having an average particle size of 100 μm or less, in the same manner as that in said primary water injector.

9. A method for spray application of a monolithic refractory material, including providing a primary water injector arranged in a spray-material feed pipe extending from a spray-material supply device to a distal spray nozzle, and a secondary water injector arranged in said spray-material feed pipe at a position adjacent to said distal spray nozzle, and injecting application water from each of said primary and secondary water injectors into a spray material which is being fed through said spray-material feed pipe, said method comprising:

arranging said primary water injector on an upstream side of said secondary water injector with a given distance therebetween;

adding 10 to 50 mass % of application water on the basis of the total mass % of application water required for said spray application from said primary water injector; and adding the remaining mass % of application water from said secondary water injector, wherein said application water added from said primary water injector is injected together with compressed air in the form of water particles having an average particle size of 100 μm or less; and wherein the spray material has an apparent porosity of 18 to 30% and a permeability of $100 \times 10^{-5}$ $cm^3 \cdot cm/cm^2 \cdot cm$ $H_2O \cdot sec$ or more, as measured in the form of an spray-applied product prepared by spray-applying said spray material at normal temperature, curing an obtained spray-applied body, and dying said cured spray-applied body at 110° C. for 24 hours or more.

10. The method according to claim 9, wherein said application water added from said secondary water injector is injected together with compressed air in the form of water particles having an average particle size of 100 μm or less, in the same manner as that in said primary water injector.

* * * * *